United States Patent
Schwarz et al.

(10) Patent No.: US 7,677,610 B2
(45) Date of Patent: Mar. 16, 2010

(54) CONNECTION AND JOINT PIECE FOR WELL TUBES

(75) Inventors: Ernst Schwarz, Volketswil (CH); Sabine Fauland, Zurich (CH)

(73) Assignee: PMA AG, Uster (CH)

( * ) Notice: Subject to any disclaimer, the term of this patent is extended or adjusted under 35 U.S.C. 154(b) by 83 days.

(21) Appl. No.: 12/067,687

(22) PCT Filed: Sep. 18, 2006

(86) PCT No.: PCT/CH2006/000505
§ 371 (c)(1),
(2), (4) Date: Mar. 21, 2008

(87) PCT Pub. No.: WO2007/038885
PCT Pub. Date: Apr. 12, 2007

(65) Prior Publication Data
US 2009/0039647 A1 Feb. 12, 2009

(30) Foreign Application Priority Data
Oct. 3, 2005 (CH) .................................. 1592/05

(51) Int. Cl.
*F16L 21/06* (2006.01)
*F16L 37/091* (2006.01)
(52) U.S. Cl. .................. 285/322; 285/319; 285/374
(58) Field of Classification Search ................ 285/305, 285/319, 322, 374, 921
See application file for complete search history.

(56) References Cited

U.S. PATENT DOCUMENTS

| | | | | |
|---|---|---|---|---|
| 4,423,891 A | * | 1/1984 | Menges | 285/305 |
| 4,625,998 A | * | 12/1986 | Draudt et al. | 285/7 |
| 4,836,580 A | * | 6/1989 | Farrell | 285/24 |
| 4,989,905 A | * | 2/1991 | Rajecki | 285/319 |
| 5,072,972 A | * | 12/1991 | Justice | 285/373 |
| 5,112,086 A | * | 5/1992 | Gruber et al. | 285/86 |
| 5,261,707 A | * | 11/1993 | Kotake et al. | 285/308 |
| 5,356,181 A | * | 10/1994 | Shirogane et al. | 285/86 |
| 5,407,236 A | * | 4/1995 | Schwarz et al. | 285/23 |
| 5,441,312 A | * | 8/1995 | Fujiyoshi et al. | 285/23 |
| 5,842,727 A | * | 12/1998 | Shade | 285/148.19 |
| 5,915,738 A | * | 6/1999 | Guest | 285/24 |
| 6,254,145 B1 | * | 7/2001 | Schwarz et al. | 285/319 |
| 6,435,567 B2 | * | 8/2002 | Kikumori et al. | 285/319 |
| 6,550,816 B1 | * | 4/2003 | Sorkin | 285/139.1 |
| 2003/0127856 A1 | * | 7/2003 | Youssefifar | 285/319 |
| 2005/0161947 A1 | * | 7/2005 | Skinner et al. | 285/374 |
| 2006/0006651 A1 | * | 1/2006 | Watanabe | 285/903 |

FOREIGN PATENT DOCUMENTS

DE 2132181 * 1/1973

* cited by examiner

*Primary Examiner*—James M Hewitt
(74) *Attorney, Agent, or Firm*—Notaro & Michalos P.C.

(57) ABSTRACT

The connection and joint piece (1) comprises a housing (3) and a sleeve (12), made from a multi-piece injection moulded plastic part. The sleeve (12) comprises an outer piece (14), forming an outer seal and an inner piece (15), forming an inner seal and a region with spring tongues (24, 25) and locking tabs (26, 27). The sleeve (12) is a multi-component injection moulded piece. In the assembled state the sleeve (12) is located in the central cavity (4) of the connector piece (1) and encloses one end (6) of a well tube (2).

14 Claims, 3 Drawing Sheets

CONNECTION AND JOINT PIECE FOR WELL TUBES

Figure 1:
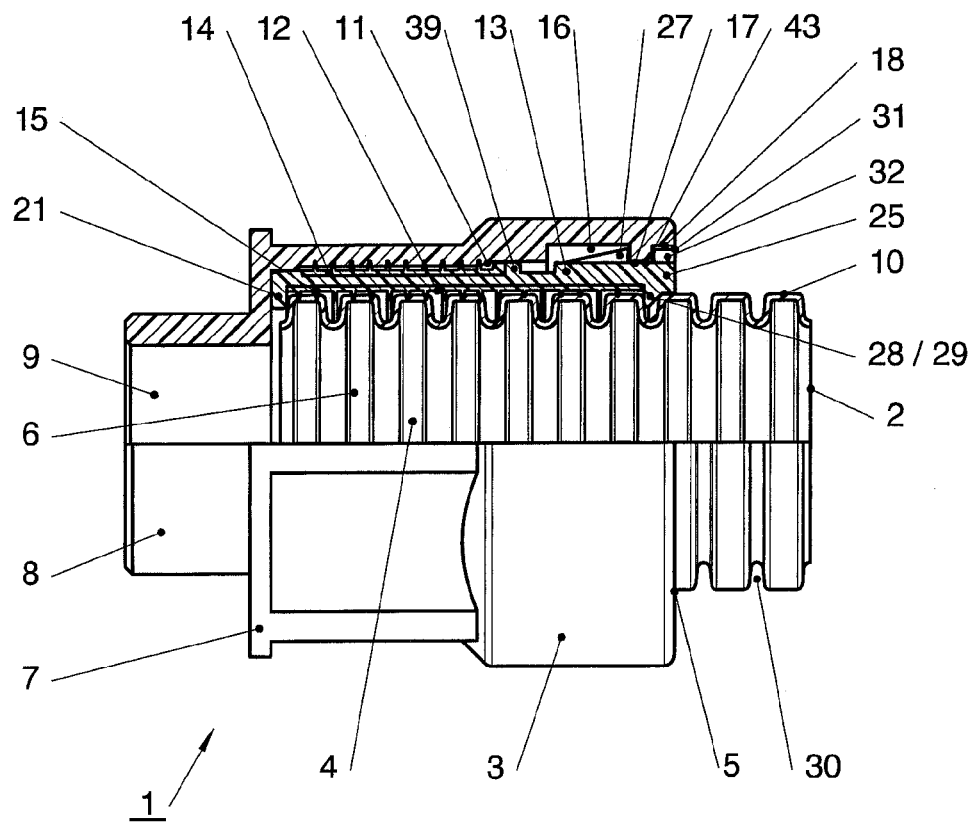

Connecting and coupling piece for corrugated tubings with a housing which comprises a hollow core volume as well as an entry opening for receiving one end of a corrugated tubing, a connecting flange and a connecting piece with a pass-through opening as well as a sleeve disposed between the outer shell of the end of the corrugated tubing and the inner shell of the hollow core volume of the housing, the sleeve comprising elastic shell segments and blocking lobes directed inwardly and outwardly.

Corrugated tubings, for example corrugated hoses, are flexible elements employed for example in the laying and protection of electrical and optical conductors in the construction industry or for the coupling of machines or other apparatus. An especially frequent application field is the use as flexible protection and guide tubing in the motor vehicle industry. In most cases the corrugated tubings are comprised of synthetic material, however, they may also be produced of metal. For the joining of corrugated tubings with one another and their coupling to apparatus, machines or devices, connecting and coupling pieces are necessary, which are also referred to, for example, as fittings or screw-in sleeves.

Connecting and coupling pieces, or coupling fittings, of this type are known in various embodiment forms. For example EP 465 896 describes a coupling fitting for a flexible corrugated hose. This coupling fitting comprises a housing with a hollow core volume, wherein one end of the corrugated hose or corrugated tubing is slid into this hollow core volume. At the end facing away from the hollow core volume of the housing a connecting piece in the form of a screw-in sleeve is located and at the rearward end of this screw-in sleeve the housing has a connecting flange. This screw-in sleeve serves for the purpose of connecting the fitting with a housing by screwing it into a threaded bore in a wall of this housing or the screw-in sleeve is inserted through a bore and clamped tight with a nut on the inside. The housing or casing of the fitting is produced through injection molding from a synthetic material, most often a thermoplastic material. Between the outer shell of the end of the corrugated tubing and the inner shell of the hollow core volume in the housing a sleeve is placed comprising several elastic, resilient shell segments. The resilient shell segments include inwardly and outwardly directed blocking lobes, wherein the outwardly directed blocking lobes engage into apertures on the shell of the housing of the fitting. The inwardly directed blocking lobes engage into a wave trough at the end of the corrugated tubing and hold it firmly in the coupling piece. Between the inner end of this sleeve and the inner end of the hollow core volume of the housing a collar-shaped seal is placed. This seal is intended to prevent the penetration of dirt and moisture through the interspace between the corrugated tubing and the coupling piece. During the assembly of this arrangement the seal must first be placed into the hollow core volume of the coupling piece. The sleeve is subsequently slid into the hollow core volume and the outer blocking lobes on the resilient shell segments snap into the recesses on the housing. The end of the corrugated tubing can now be inserted into the coupling piece and the connection between these two structural elements can be completed. There is the risk when assembling the two structural elements that the seal, due to the insertion of the tubing, is deformed or damaged and thereby the sealing effect is reduced or nullified. Even if the end of the corrugated tubing is not completely slid into the coupling piece, it is nevertheless stuck through the blocking lobes. In such a position, however, the secure connection is not ensured and the effect of the sealing is also inapplicable. When curing or bending over the corrugated tubing with respect to the coupling piece, the sleeve can be canted off on one side in the coupling piece which leads to additional reduction of the sealing tightness, however, possibly also to the detaching or tearing-out of the connection. In particular in connections exposed to splash water, these shortcomings are of disadvantage and can lead to failure and damage. In particular in applications in motor vehicle construction or on machine tools it is important that no dirt and no splash water can penetrate into the interior of the connection.

The goal of the present invention is therefore providing a connecting and coupling piece for corrugated tubings, in which it is necessary to completely insert the tubing in order to complete the connection and checking of the complete insertion is possible, the secure and sustained sealing between all parts of the connection is ensured, the canting of the core sleeve in the housing is prevented, the snapping-in of the core sleeve into the blocking position in the housing can take place in any circumferential position, as well as high security against the tearing-out of the corrugated tubing is provided and in which the outer surface as much as possible does not offer structural parts of the connection attack points for the penetration of dirt and splash water.

This goal is attained through the characteristics defined in the claims.

The connecting and coupling piece according to the invention comprises a sleeve which is a multipart synthetic injection molded part, the various parts being fixedly connected with one another. A first cylindrical part of this sleeve forms a core sleeve, a second cylindrical part covers at least one subregion of the outer shell of this core sleeve, and a third cylindrical part covers at least a subregion of the inner shell of the core sleeve. The sleeve and its individual parts are advantageously formed as a multicomponent injection molded part and also joined through multicomponent injection molding. This structuring of the sleeve makes it possible to utilize different materials for the various individual parts of the sleeve and thereby to solve the task of high tear-out strength and secure tightness by means of a single structural part. This permits further the optimal form design of the individual parts of the sleeve. A functional structuring of the subject matter of the invention provides that the second part of the sleeve has at its outer shell several radially outwardly directed encircling sealing lips spaced apart from one another. The third part of the sleeve has at the inner shell radially inwardly directed encircling sealing lips spaced apart from one another. Through this disposition between the inner shell of the hollow core volume on the housing and the outer shell of the sleeve, as well as between the inner shell of the sleeve and the outer shell of the corrugated tubing, one labyrinth seal each is formed. These labyrinth seals extend over a relatively long region of the contact faces between the structural elements and thereby form a very good sealing action against the penetration of dirt and splash water.

According to the invention it is further proposed that the shell of the housing is closed and does not have any radial apertures. The housing, furthermore, at the end with the entry opening comprises on the shell of the hollow core volume includes an annular groove and between this annular groove and the entry opening an inwardly directed, annular rib is formed. This structuring of the housing cooperates with correspondingly formed blocking parts on the sleeve, this shape forming making unnecessary the application of apertures on the shell of the housing. Thereby a substantially weak site of the known coupling pieces is avoided and the tightness is additionally considerably improved.

A functional structuring of the subject matter of the invention provides that on the outer end region of the core sleeve with the entry opening, several longitudinal slots are disposed and the shell of the core sleeve in this end region is divided into several tongues elastically movable in the radial direction. These longitudinal slots do not extend over the entire length of the core sleeve but rather only over a subregion, from the end region with the entry opening toward the center region. On at least one of these tongues of the core sleeve is disposed at least one outwardly directed blocking lobe. Simultaneously, on the outer end region of the core sleeve an inwardly directed rib is formed, which forms one or several claw fasteners. In the installation position of the corrugated tubing, these claws engage into a wave trough on the outer shell of the corrugated tubing and hold it securely. In a further structuring the core sleeve includes at an inner end region an inwardly directed shoulder as a stop for the end of the corrugated tubing. Through this structuring the sleeve can be slid onto the end of a corrugated tubing and the elastically movable tongues can be deflected outwardly in the radial direction and the inwardly directed claws can be slid over the corrugations on the outer shell of the corrugated tubing. The sleeve can thereby be completely slid onto the end of the corrugated tubing until the corrugated tubing end is at the stop shoulder on the inner end region of the sleeve.

The inwardly directed annular surface of the annular rib on the housing is advantageously formed as a conical face. This conical face diverges in the direction of the entry opening. When connecting the end of the corrugated tubing with the coupling piece, first, the sleeve is slid onto the end of the corrugated tubing and subsequently the end of the corrugated tubing with the slid-on sleeve is inserted into the hollow core volume of the housing. Therein one or several of the outwardly directed blocking lobes on the movable tongues of the sleeve is(are) inwardly deflected at the conical face of the annular rib on the housing and behind this rib snap(s) into the annular groove on the shell of the hollow conical volume. The deflection of the blocking lobes inwardly is herein made possible through elastic deformation, on the one hand, of the corrugated tubing and, on the other hand, of the annular rib or of the housing in this region. After the snapping-in of the outwardly directed blocking lobe into the annular groove on the housing, the claws engage on the inwardly directed rib on the core sleeve into a wave trough on the corrugated tubing and are held securely in this position through the annular rib on the housing. This is assured thereby that the inner diameter of the annular rib on the housing is only minimally greater than the outer diameter of the core sleeve in the region between the stop face of the outwardly directed blocking lobe and the outer end face of the sleeve.

A further development of the invention provides disposing on the outer end of the core sleeve an outwardly directed annular collar, which cooperates with an annular groove, open in the axial direction, on the entry opening of the housing. In the snapped-in installation position of the sleeve in the housing this annular collar, together with the annular groove, functions also as a labyrinth seal and prevents the penetration of dirt and splash water. On the annular collar on the core sleeve a recess is located and one or several outwardly directed blocking lobes are formed in the proximity of this recess on at least one of the elastically movable tongues of the core sleeve. If the connection between corrugated tubing and coupling piece is to be released, a tool, for example the front end of a screw driver, can be inserted into this recess and by canting and elastically deforming, the blocking effect of the outwardly directed blocking lobe can be nullified. The corrugated tubing can subsequently be pulled out of the coupling piece. The connection is consequently releasable and can repeatedly be closed and opened again.

It is also advantageous to dispose on the central region of the outer shell of the core sleeve at least one additional outer rib which, in the installation position of the core sleeve in the housing, is in contact on the inner shell of the hollow core volume of the housing and centers the core sleeve. This additional outer rib on the core sleeve prevents the canting of the sleeve in the hollow core volume of the housing when the corrugated tubing is curved or bent-over. It thereby improves the security of the connection and protects the connection parts against damage. The outer rib can include gaps such that lobes are formed.

A further structuring of the invention provides that the housing and the first part of the sleeve which forms the core sleeve is formed of a hard thermoplastic synthetic material and that this synthetic material is a synthetic material from the group of polyamides (PA) or polypropylenes (PP). The second and the third part of the sleeve is advantageously formed of a thermoplastic elastomeric synthetic material and this is a synthetic material from the group of polyurethane elastomers (TPE-U) or of olefin elastomers (TPE-O) or of amide elastomers (TPE-A) or a cross-linked thermoplastic elastomer (TPE-X). On the housing and on the core sleeve are formed blocking and holding elements which must absorb the forces and transfer them and ensure the secure connection between corrugated tubing and coupling piece. The hard thermoplastic synthetic material can fulfill this task since the proposed synthetic materials have the necessary solidity. The thermoplastic elastomeric synthetic materials which are proposed for the second and the third part of the sleeve have an elasticity optimal for their use as sealing elements. Both groups of materials are very well suited for injection molding in the multicomponent method and together form an optimal combination for this application.

The secure holding together of the individual parts of the sleeve, namely the core sleeve and the second as well as the third cylindrical part, is due to the type of connection. The parts can be implemented such that they are connected with one another during the injection molding under form- and force-fit joining. However, it is also possible to connect the three individual parts of the sleeve on the mutual contact faces under material positive-joining. Herein, on the contact faces, a material joining or cross-linking of the parts is completed. However, it can also be of advantage to connect the three individual parts of the sleeve with one another on the mutual contact faces through a combination of form-fit, force-fit, and material positive-joining. These different capabilities for connecting the parts allow the engineer wide forming latitude and make possible the simple adaptation to different requirements of the connection between corrugated tubing and coupling piece. The sleeve can be formed optimally for the assumption of its tasks, namely ensuring the tightness against dirt and splash water as well as the reliable transfer and absorption of forces acting onto the corrugated tubing and the coupling piece.

The third part of the sleeve extends advantageously into the longitudinal slots, which are developed on the core sleeve, and at least partially fills out these longitudinal slots. Since the third part of the sleeve is comprised of elastically relatively soft synthetic material, the tongues of the core sleeve can nevertheless be deflected inwardly or outwardly in the radial direction. The material of the third part of the sleeve injected into these longitudinal slots, has also the function of a sealing of these longitudinal slots.

Figure 2:
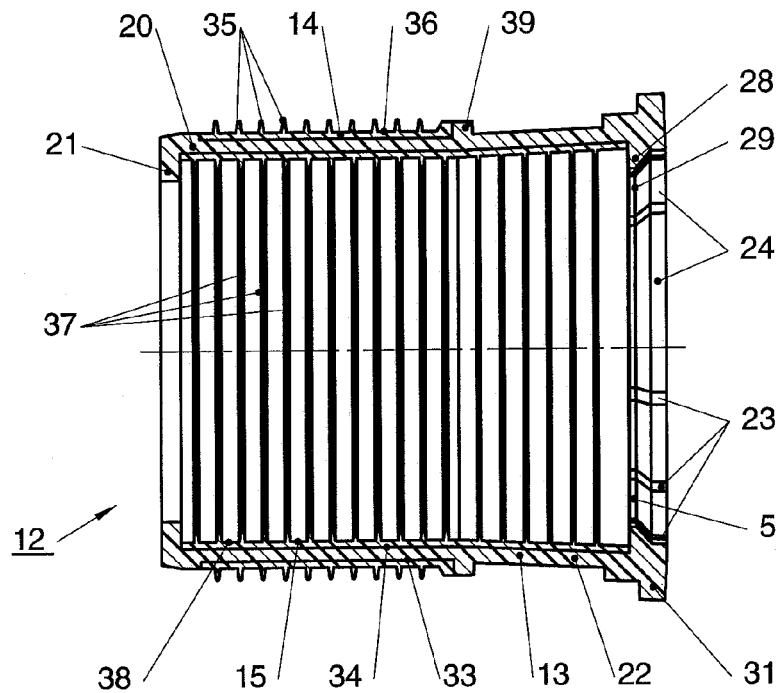
Figure 3:
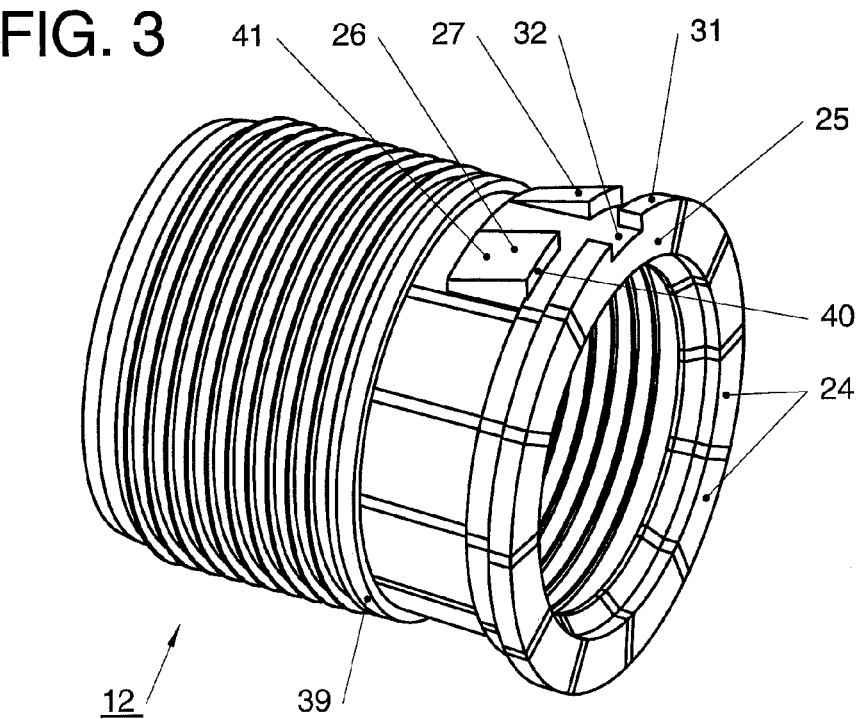
Figure 4:
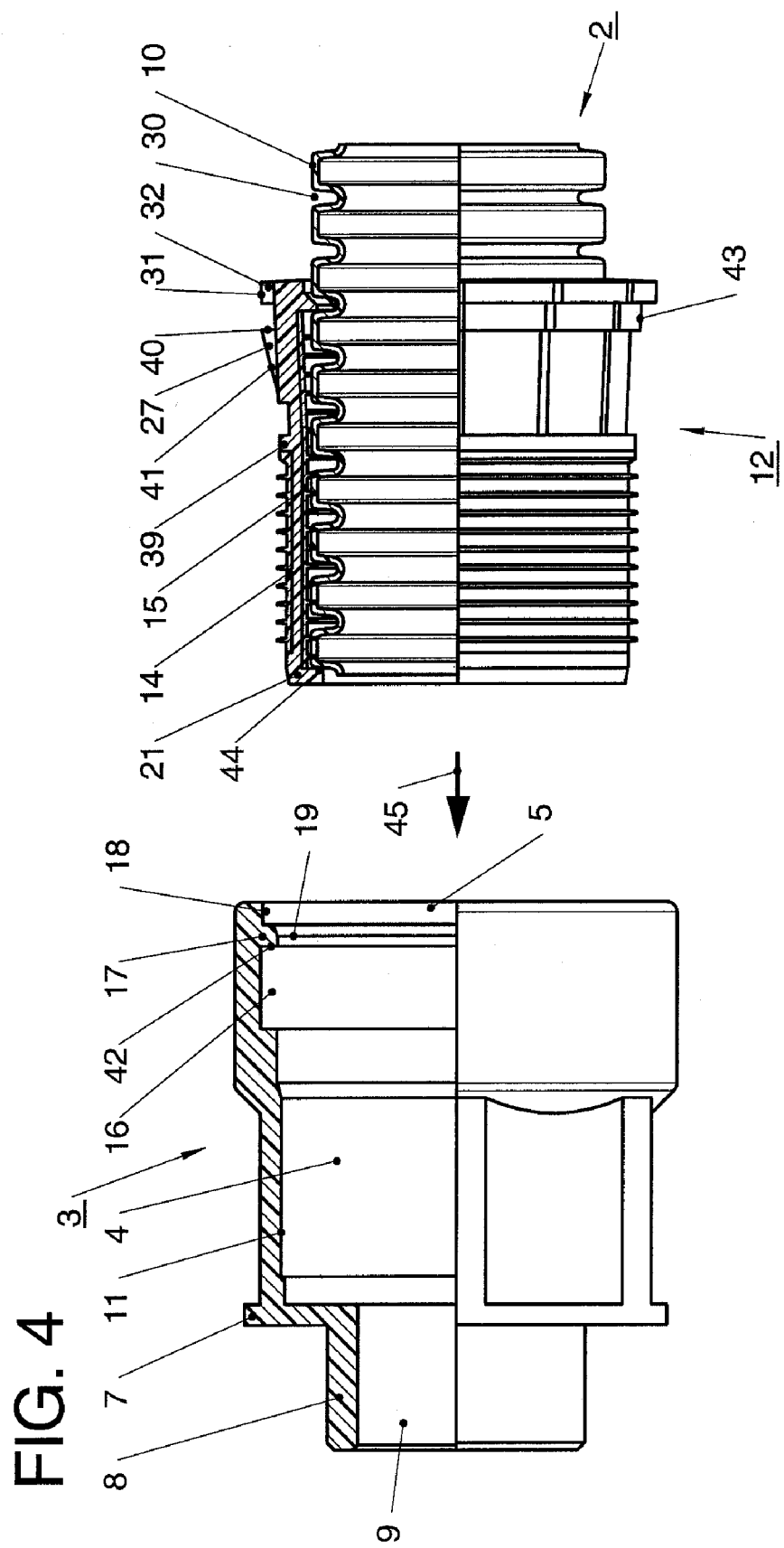

In the following the invention will be explained in further detail in conjunction with embodiment examples with reference to the attached drawing. Therein depict:

FIG. 1 a connecting and coupling piece with an inserted tubing end, in partial section, FIG. 2 a longitudinal section through a sleeve according to the invention, FIG. 3 a perspective view of a sleeve according to the invention, and FIG. 4 a connecting and coupling piece and a tubing end with the sleeve emplaced, before assembly.

FIG. 1 shows a coupling piece 1 with an inserted end 6 of a corrugated tube 2. The upper portion is depicted as a cross section. The coupling piece 1 comprises a housing 3 with a hollow core volume 4. The housing 3 includes at one end an entry opening 5 toward which the hollow core volume 4 is also open. At the opposing end of the housing 3 is developed a connecting piece 8 with a pass-through opening 9 and a connecting flange 7. In the depicted example the connecting piece 8 is implemented as a screw-in sleeve. However, it can also have another form known for such coupling pieces. It can, for example, also be a coupling element for the connection with a second corrugated tubing. In the hollow core volume 4 of housing 3 is located a sleeve 12 which encompasses the end 6 of the corrugated tubing 2. The housing 3 comprises a completely closed shell without radial apertures. The housing 3 as well as also the sleeve 12 in the depicted example are injection molded parts of synthetic material. The housing 3 is formed of a hard thermoplastic synthetic material and, in the present example, is comprised of polyamide (PA). The sleeve 12 is comprised of several synthetic parts formed and connected with one another by multicomponent injection molding.

The development and the structure of the sleeve 12 are shown in FIGS. 2 and 3. FIG. 2 shows a longitudinal section through the sleeve 12 according to the invention and FIG. 3 a perspective view of this sleeve 12. The sleeve 12 comprises a first cylindrical part, which forms a core sleeve 13, and a second cylindrical part 14, which covers at least one subregion of the outer shell 33 of this core sleeve 13, as well as a third cylindrical part 15 which covers at least one subregion of the inner shell 34 of this core sleeve 13.

The core sleeve 13 in the depicted example is of the same hard synthetic material as the housing 3, namely of polyamide (PA). However, the first part 13 and the second part 14 of the sleeve 12 are comprised of a rather soft thermoplastic elastomeric synthetic, in the depicted example of a polyurethane elastomer (TPE-U). The three parts 13, 14, 15 of sleeve 12 are connected with one another through form-fit and/or force-fit and/or material positive-joining. This connection is generated through injection molding in the multicomponent injection molding method. The second part 14 is formed as a cylindrical collar and is inserted or injected into a depression on the outer shell 33 of the core sleeve 13. On the outer shell 36 of this second part 14 several radially outwardly directed encircling sealing lips 35, spaced apart from one another, are formed. These sealing lips 35 are in contact with the inner shell 11 of the hollow core volume 4 on housing 3 and form a labyrinth seal. Since the second part 14 is formed of a soft elastic synthetic material, these sealing lips 35 adapt to the inner shell 11 and form a very good sealing. The third part 15 is also formed as a cylindrical collar and is inserted or injected along the inner shell 34 of the core sleeve 13.

This third part 15 includes on the inner shell 38 radially inwardly directed encircling sealing lips 37 spaced apart from one another. Since this third part 15 and its sealing lips 37 are also comprised of a soft elastic material, these sealing lips 37 can adapt very readily to the outer shell 10 of the corrugated tubing 2 and, with respect to this outer shell 10, can also form a labyrinth seal. Between the end 6 of the corrugated tubing 2 and the sleeve 12 a secure sealing is thereby also ensured.

The core sleeve 13 includes on the end region 20 an inwardly directed shoulder 21 which forms a stop for the end 6 of corrugated tubing 2. On the opposite outer end region 22 of the core sleeve 13 with the entry opening 5 several longitudinal slots 23 are disposed along the circumference. These longitudinal slots 23 extend from the outer end of core sleeve 13 to approximately the central region of the core sleeve 13. Through these longitudinal slots 23 are formed tongues 24, 25 whose free ends are elastically movable in the radial direction. On at least one of these tongues 24, 25 is located an outwardly directed blocking lobe 26, 27 with a stop face 40. In the depicted example on one tongue 25 two such blocking lobes 26, 27 are disposed, which are spaced apart from one another in the circumferential direction. On the region of the blocking lobes 26, 27 directed toward the outer end 22 is located the stop face 40. At a spacing from this stop face 40 an outwardly directed annular collar 31 is disposed on the outer end region 22 of core sleeve 13. In this annular collar 31 is a recess 32 which is formed in the region of the interspace between the two blocking lobes 26 and 27. This recess 32 permits the insertion of an aid tool for releasing the connection between sleeve 12 and housing 3. On the outer end 22 of core sleeve 13 is located, furthermore, an inwardly directed rib 28 on which, in the depicted example, several claw fasteners 29 are formed through the longitudinal slots 23. With the corrugated tubing end 6 inserted, these claws 29 engage on the outer shell 10 of corrugated tubing 2 into a wave trough 30 and connect the corrugated tubing 2 with the sleeve 12. The third part 15 extends into the longitudinal slots and fills them out. This is especially clearly evident in FIG. 3. It is thereby ensured that these longitudinal slots 23 are also sealed off against the penetration of dirt and splash water. However, the elastic material of the third part 15 ensures also simultaneously the movability of the tongues 24, 25 such that these can act as spring elements.

Approximately on the central region of outer shell 33 of core sleeve 13 is formed at least one additional outer rib 39. In the installation position of the core sleeve 12 in the hollow core volume 4 of housing 3 this outer rib 39 is in contact on the inner shell 11 of the hollow core volume 4. It therewith braces the sleeve 12 against cantings and bendings under load if the corrugated tubing 2 is curved or bent over. In the depicted example the outer rib 39 is formed as a closed ring. However, such can also be gapped and form lobes.

For the mounting of the sleeve 12 in housing 3 are formed corresponding elements on the inner shell 11 of the hollow core volume 4. These are shown in FIG. 1 and FIG. 4.

On the end region of housing 3 with the entry opening 5 is formed an annular groove 18 open in the axial direction. This groove serves for receiving the annular collar 31 on the core sleeve 13. Adjoining the annular groove 18 is formed an annular rib 17 which cooperates with the blocking lobes 26, 27 on the sleeve 12. The inwardly directed annular face 19 of this annular rib 17 is implemented as a conical face which diverges toward the entry opening 5. The blocking lobes 26, 27 have oblique slide faces 41 which, during the sliding-together of the sleeve 12 and of housing 3, cooperate with this conical annular face 19. During the sliding-together the blocking lobes 26, 27, and therewith the elastic tongue 25, are displaced inwardly by the rib 17. Behind the rib 17 is formed on housing 3 a further annular groove 16 which serves for receiving the blocking lobes 26, 27 in the installation position of the sleeve 12 in the housing 3. After the sleeve 12 has been completely slid into the hollow core volume 4 of housing 3, the blocking lobes 26, 27 spring behind rib 17 back into their starting position and thereby snap into a blocking position. The stop faces 40 are subsequently in contact on the inner shoulder 42 of the annular rib 17 on housing 3. As is evident in FIG. 1, in the installation position of the sleeve 12 in housing 3, the blocking lobes 26, 27 extend, on the one hand, into the blocking positions behind the annular rib 17 on housing 3. On the other hand, the claws 29, formed on rib 28 on sleeve 12, engage into a wave trough 30 on the outer shell 10 of the corrugated tubing 2. The outer shell 43 of core sleeve 13 has in this region a diameter which is only minimally smaller than the inner diameter of the conical annular face 19 on rib 17 of housing 3. Thereby the claws 29 are also fixed in place in the blocking position in a wave trough 30 of corrugated tubing 2 and therewith the inserted corrugated tubing 2 is securely held in the housing 3 or in the coupling fitting 1. In the depicted installation position the contact faces between the outer shell 10 of the corrugated tubing 2 and the sleeve 12 are completely and securely sealed off through the second part 14 of sleeve 12. The contact faces between a substantial subregion of the outer shell 33 of the sleeve 12 and the inner shell 11 of the hollow core volume 4 are completely and securely sealed off through the third part 15 of sleeve 12.

FIG. 4 shows the manner in which the end 6 of a corrugated tubing 2 is assembled with the housing 3. First, the sleeve 12 is completely slid onto the end 6 of the corrugated tubing 2 until the end face 44 of the corrugated tubing end 6 is in contact on the shoulder 21 of sleeve 12. If the sleeve 12 is not completely slid onto the corrugated tubing end 6, the complete sliding-on takes place during the insertion into the housing 3, since then the blocking lobes 26, 27 are applied at the rib 17 and this resistance can only be overcome after the complete sliding-on of the sleeve 12 onto the corrugated tubing end 6. It is thereby ensured that the end 6 of corrugated tubing 2 is always completely inserted into the sleeve 12 and therewith into the hollow core volume 4 of the housing 3. This can be checked since no blocking connection is generated as long as the parts are not completely mated. The mating of the corrugated tubing 2 with the sleeve 12 and the housing 3 takes place in the direction of arrow 45.

With the coupling piece 1 according to the invention, which comprises the sleeve 12 implemented according to the invention and the housing 3, the corrugated tubing 2 must be inserted completely into the coupling piece 1 in order for the blocking connection to result. This assures that, on the one hand, all sealing elements are in the correct position and, on the other hand, the desired force transfer and the corresponding security against the tearing-out of the corrugated tubing 2 is ensured. The disposition of the sealing elements on the second part 14 and on the third part 15 of sleeve 12 as well as the cooperation of the annular collar 31 on the sleeve 12 with the open annular groove 18 on housing 3 lead to virtually complete tightness against the penetration of dirt and splash water into the interior of the coupling piece 1 or the corrugated tubing 2. The solution according to the invention makes it possible that on the shell of the housing 3 no apertures need to be disposed and that the corrugated tubing 2 with the sleeve 12 can be slid in any circumferential position into the hollow core volume 4 of the housing 3 and therewith also the blocking action is generated in any circumferential position. This facilitates the assembly considerably.

The invention claimed is:

1. Connecting and coupling piece (1) for corrugated tubings (2) having an end (6) with an outer shell (10), the connecting and coupling piece comprising:

a housing (3) comprising a hollow core volume (4), an entry opening (5) for receiving one end (6) of a corrugated tubing (2), a connecting flange (7) and a connecting piece (8) with a pass-through opening (9);

a sleeve (12) located between the outer shell (10) of the end (6) of the corrugated tubing (2) and an inner shell (11) of the hollow core volume (4) of the housing (3), the sleeve (12) comprising a multipart synthetic material injection molded part;

the tubing end (6), the sleeve (12) and the housing (3) being fixedly connected with one another;

a first cylindrical part of the sleeve (12) forming a core sleeve (13), a second cylindrical part (14) of the sleeve (12) covering at least one subregion of an outer shell (33) of the core sleeve (13) and a third cylindrical part (15) of the sleeve (12) covering at least a subregion of an inner shell (34) of the core sleeve (13);

an outer end region (22) of the core sleeve (13) containing the entry opening (5) and having a plurality of longitudinal slots (23) disposed around the entry opening (5), the core sleeve (13) in the outer end region (22) being divided into a plurality of tongues (24, 25) by the longitudinal slots (23) that are elastically movable in a radial direction, and on at least one of the tongues (25) of the core sleeve (13) at least one outwardly directed blocking lobe (26, 27) with a stop face (40) is disposed; and wherein the third cylindrical part (15) of the sleeve (12) engages in one piece into the longitudinal slots (23) of the core sleeve (13) and at least partially fill the longitudinal slots (23).

2. Connecting and coupling piece for corrugated tubings as claimed in claim 1, wherein the sleeve (12) and its parts (13, 14, 15) are formed and joined as a multicomponent injection molded part.

3. Connecting and coupling piece for corrugated tubings as claimed in claim 1, wherein the second part (14) of the sleeve (12) on outer shell (36) includes several radially outwardly encircling sealing lips (35) spaced apart from one another.

4. Connecting and coupling piece for corrugated tubings as claimed in claim 1, wherein the third part (15) of the sleeve (12) on an inner shell (38) of the third part (15) includes radially inwardly directed encircling sealing lips (37) spaced apart from one another.

5. Connecting and coupling piece for corrugated tubings as claimed in claim 1, wherein the housing (3) does not have any radial apertures.

6. Connecting and coupling piece for corrugated tubings as claimed in claim 1, wherein the housing (3) includes, at the end with the entry opening (5), on the inner shell (11) of the hollow core volume (4) an annular groove (16) and between the annular groove (16) and the entry opening (5) an inwardly directed annular rib (17).

7. Connecting and coupling piece for corrugated tubings as claimed in claim 6, wherein the inwardly directed annular face (19) of the annular rib (17) on the housing (3) is formed as a conical face.

8. Connecting and coupling piece for corrugated tubings as claimed in claim 1, wherein the core sleeve (13) includes at an inner end region (20) an inwardly directed shoulder (21) as a stop for the corrugated tubing end (6).

9. Connecting and coupling piece for corrugated tubings as claimed in claim 1, wherein on the outer end region (22) of the core sleeve (13) an inwardly directed rib (28) forms one or several claw fasteners (29) which in an installation position of the corrugated tubing (2) engage into a wave trough (30) on the outer shell (10) of the corrugated tubing (2).

10. Connecting and coupling piece for corrugated tubings as claimed in claim 1, wherein on the outer end region (22) of the core sleeve (13) an outwardly directed annular collar (31) is disposed, which cooperates with an annular groove (18) open in the axial direction on the entry opening (5) of the housing (3).

11. Connecting and coupling piece for corrugated tubings as claimed in claim 10, wherein the annular collar (31) on the core sleeve (13) has a recess (32), and in the proximity of this recess (32) on at least one of the elastically movable tongues (25) of the core sleeve (13) at least one outwardly directed blocking lobe (26, 27) is disposed.

12. Connecting and coupling piece for corrugated tubings as claimed in claim 1, wherein on a central region of the outer shell (33) of the core sleeve (13) at least one additional outer rib (39) is disposed which, in an installation position of the sleeve (12) in the housing (3), is in contact on the inner shell (11) of the hollow core volume (4) of the housing (3).

13. Connecting and coupling piece for corrugated tubings as claimed in claim 1, wherein the housing (3) and the first part of the sleeve (12), which forms the core sleeve (13), are formed of a synthetic material selected from the group consisting of polyamides (PA) and polypropylenes (PP).

14. Connecting and coupling piece for corrugated tubings as claimed in claim 1, wherein the second (14) and the third part (15) of the sleeve (12) are formed of a a synthetic material selected from the group consisting of polyurethane elastomers (TPE-U), olefin elastomers (TPE-O), amide elastomers (TPE-A) and a cross-linked thermoplastic elastomer (TPE-X).

* * * * *